(12) United States Patent
Debnath et al.

(10) Patent No.: US 11,354,935 B2
(45) Date of Patent: Jun. 7, 2022

(54) OBJECT RECOGNIZER EMULATION

(71) Applicant: NEC Laboratories America, Inc., Princeton, NJ (US)

(72) Inventors: Biplob Debnath, Princeton, NJ (US); Erik Kruus, Hillsborough, NJ (US); Murugan Sankaradas, Dayton, NJ (US); Srimat Chakradhar, Manalapan, NJ (US)

(73) Assignee: NEC CORPORATION

( * ) Notice: Subject to any disclaimer, the term of this patent is extended or adjusted under 35 U.S.C. 154(b) by 147 days.

(21) Appl. No.: 16/810,061

(22) Filed: Mar. 5, 2020

(65) Prior Publication Data

US 2020/0293758 A1 Sep. 17, 2020

Related U.S. Application Data

(60) Provisional application No. 62/816,479, filed on Mar. 11, 2019.

(51) Int. Cl.
| | |
|---|---|
| *G06K 9/00* | (2022.01) |
| *G06V 40/16* | (2022.01) |
| *G06N 20/00* | (2019.01) |
| *G06K 9/62* | (2022.01) |

(52) U.S. Cl.
CPC ......... *G06V 40/172* (2022.01); *G06K 9/6256* (2013.01); *G06K 9/6268* (2013.01); *G06N 20/00* (2019.01)

(58) Field of Classification Search
CPC ................. G06K 9/00288; G06K 9/6256
See application file for complete search history.

(56) References Cited

U.S. PATENT DOCUMENTS

| 10,402,695 | B1 * | 9/2019 | Kim ..................... G06K 9/6232 |
| 2011/0064302 | A1 * | 3/2011 | Ma ....................... G06K 9/6232 |
| | | | 382/159 |

OTHER PUBLICATIONS

Gupta, Vikas, Face Detection—OpenCV, Dlib and Deep Learning (C++ / Python), https://www.learnopencv.com/face-detection-opencv-dlib-and-deep-learning-c-python/. Oct. 22, 2018 (pp. 1-20.).

* cited by examiner

*Primary Examiner* — Tuan H Nguyen
(74) *Attorney, Agent, or Firm* — Joseph Kolodka

(57) ABSTRACT

A computer-implemented method for emulating an object recognizer includes receiving testing image data, and emulating, by employing a first object recognizer, a second object recognizer. Emulating the second object recognizer includes using the first object recognizer to perform object recognition on a testing object from the testing image data to generate data, the data including a feature representation for the testing object, and classifying the testing object based on the feature representation and a machine learning model configured to predict whether the testing object would be recognized by a second object recognizer. The method further includes triggering an action to be performed based on the classification.

17 Claims, 5 Drawing Sheets

OBJECT RECOGNIZER EMULATION

RELATED APPLICATION INFORMATION

This application claims priority to provisional application Ser. No. 62/816,479, filed on Mar. 11, 2019, incorporated by reference herein in its entirety.

BACKGROUND

Technical Field

The present invention relates to artificial intelligence and machine learning, and more particularly to object recognizer emulation.

Description of the Related Art

Using artificial intelligence (AI) technology, various objects (e.g., faces, tattoos, vehicles) can be recognized in images (e.g., still images and videos) using a neural network. However, the accuracy of an object recognizer depends on its underlying machine learning models. Highly accurate object recognizers can be expensive in terms of cost and/or resource use (e.g., larger model, need for specialized hardware).

SUMMARY

According to an aspect of the present invention, a method for emulating an object recognizer is provided. The method includes receiving, by an emulator associated with a computer system, testing image data, and emulating, by the emulator employing a first object recognizer, a second object recognizer. Emulating the second object recognizer includes using the first object recognizer to perform object recognition on a testing object from the testing image data to generate data, the data including a feature representation for the testing object, and classifying the testing object based on the feature representation and a machine learning model configured to predict whether the testing object would be recognized by a second object recognizer. The method further includes triggering, by the emulator, an action to be performed based on the classification.

In accordance with another embodiment of the present invention, a system for emulating an object recognizer is provided. The system includes an emulator including at least one processor device operatively coupled to a memory device. The at least one processor device is configured to receive testing image data, and emulate, by employing a first object recognizer, a second object recognizer by using the first object recognizer to perform object recognition on a testing object from the testing image data to generate data, the data including a feature representation for the testing object, and classifying the testing object based on the feature representation and a machine learning model configured to predict whether the testing object would be recognized by a second object recognizer. The at least one processor device is further configured to trigger an action to be performed based on the classification.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The embodiments described herein can use a first object recognizer that can recognize a set of objects to emulate the functionality of a second object recognizer that can recognize the second set of objects using machine learning. The second object recognizer can be a more accurate object recognizer than the first object recognizer and thus may necessitate higher operation cost and/or computing resource usage than the first object recognizer. More specifically, the embodiments described herein can be used to identify the common objects that can be recognized by both the first and second object recognizers (e.g., the intersection of a first set of objects recognized by the first object recognizer and a second set of objects recognized by the second object recognizer).

To perform the emulation in accordance with the embodiments described herein, a first set of objects recognized by the first object recognizer are identified. Then, each object from the first set of objects is sent to the second object recognizer to determine whether the second object recognizer can recognize the object. Each object can then be labeled based on the determination. For example, the object can be labeled as a common object (e.g., "+1") if the second object recognizer can recognize the object and can be labeled as an uncommon object (e.g., "−1") otherwise. Once all the recognized objects of the first set of objects are labeled, a machine learning model (e.g., a binary classification model) can be learned based on features generated by the first object recognizer and labels generated by the second object recognizer. Then, given a new object recognized by the first object recognizer, the machine learning model can predict whether the new object would be recognized by the second object recognizer as well.

The embodiments described herein can be used to improve the functionality of an object recognition system. For example, emulating the second object recognizer can reduce operation cost and/or computing resource usage. As another example, emulating the second object can improve system downtime when network connectivity is down.

Figure 1:
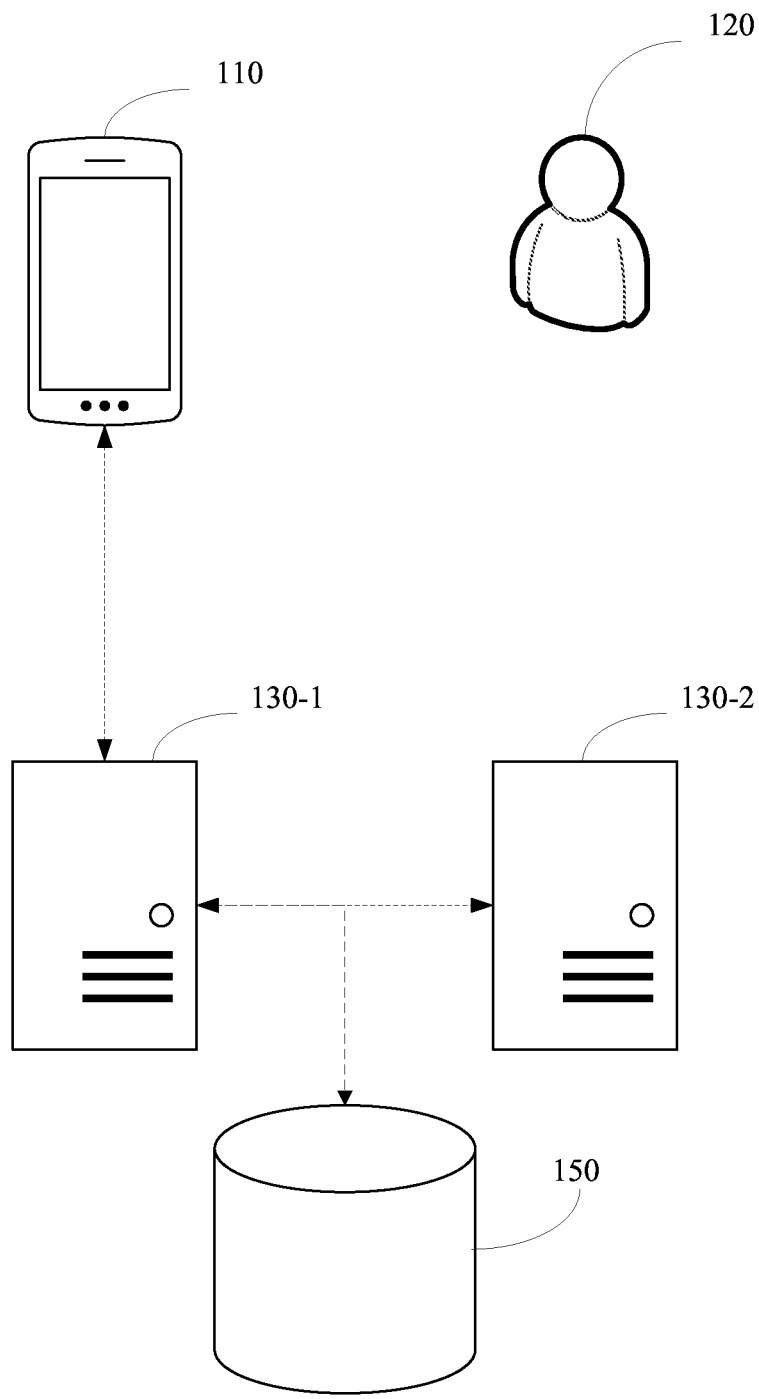
FIG. 1 is a diagram illustrating an exemplary environment implementing object recognition, in accordance with an embodiment of the present invention.

Referring now in detail to the figures in which like numerals represent the same or similar elements and initially to FIG. 1, a block/flow diagram is provided illustrating a block/flow diagram of a high-level overview of an exemplary system 100 implementing an object recognizer emulator. More specifically, in this embodiment, the system 100 implements a facial recognition system. Although the illustrative embodiment of FIG. 1 is described within the context of facial recognition, the embodiments described herein can be applied to any system capable of implementing object recognition.

As shown, the system 100 includes a computing device 110. In one embodiment, the computing device 100 is an Internet of Things (IoT) device within an IoT network. In this illustrative embodiment, the computing device 110 is depicted as a mobile phone (e.g., smartphone). However, the computing device 110 can be any suitable computing device in accordance with the embodiments described herein.

For example, the system 100 can be configured to implement any suitable object recognizer (e.g., face detector/recognizer) in accordance with the embodiments described herein. Object recognizers (e.g., face detectors/recognizers) can be included in suitable software libraries or toolkits such as, e.g., OpenCV and Dlib.

Examples of facial recognition technologies include, but are not limited to, Haar Cascade Face Detectors, Deep Neural Network (DNN)-based Face Detectors, Convolutional Neural Network (CNN)-based Face Detectors, Histogram of Oriented Gradient (HOG) Face Detectors and Feature Extractors, Max-Margin Objection Detection (MMOD)-based Face Detectors, ResNet, FaceNet, VGG-Face models, etc.

Object recognition accuracy and speed can vary across different models. Additionally, costs among object recognition engines can vary. To reduce costs associated with object recognition, the system 100 can filter out objects that cannot be detected by a more accurate and costly object recognition engine, in order to emulate the behaviors of such an object recognition engine using a less costly object recognition engine. In terms of cost, the less costly object recognizer could be an open-source or free software, while the costlier object recognizer could be provided by a commercial software-as-a-service (SaaS) and/or software development kit (SDK) technology using a license-based or pay-as-you-go pricing model. The less costly recognizer can use fewer computing resources (e.g., RAM, CPU and/or GPU) as compared to the more costly recognizer. Accordingly, the system 100 can permit edge or IoT devices to perform object recognition with reduced operational costs as compared to more costly commercial object recognizers.

More specifically, the system 100 includes a computing device 110 can have an object recognition application installed thereon configured to take image data (e.g., still images and/or a video sequence) of an object 120 and initiate object recognition based on the image data of the object 120. For example, in this illustrative embodiment, the object 120 can be a face of a user 120, and the computing device 110 can include a facial recognition application installed thereon configured to take image data of the face of the user 120 and initiate facial recognition based on the image data of the face of the user 120.

The system 100 further includes computing devices (e.g., servers) 130-1 and 130-2, and at least one database 150. The computing device 130-1 can be configured to implement a first object recognizer, the computing device 130-2 can be configured to implement a second object recognizer. The second object recognizer can be a highly accurate and more expensive object recognizer to implement relative to the first object recognizer. In an alternative embodiment, the first and second object recognizers can be implemented on the same computing device.

The system 100 can use the image data corresponding to the object 120 to implement a training stage to train the first object recognizer as an emulator for the second object recognizer by building a machine learning model (e.g., classifier), and implement a testing stage to predict whether a new object would be recognized by the second object recognizer using the machine learning model. The machine learning model can be stored in the database 150. As will be described in further detail herein below, the first object recognizer in conjunction with the machine learning model can be used to emulate the second object recognizer to recognize common objects capable of being recognized by both object recognizers. In one example, the emulation can help reduce operation cost, and in another example, the emulation can help improve system downtime when network connectivity is down.

Figure 2:
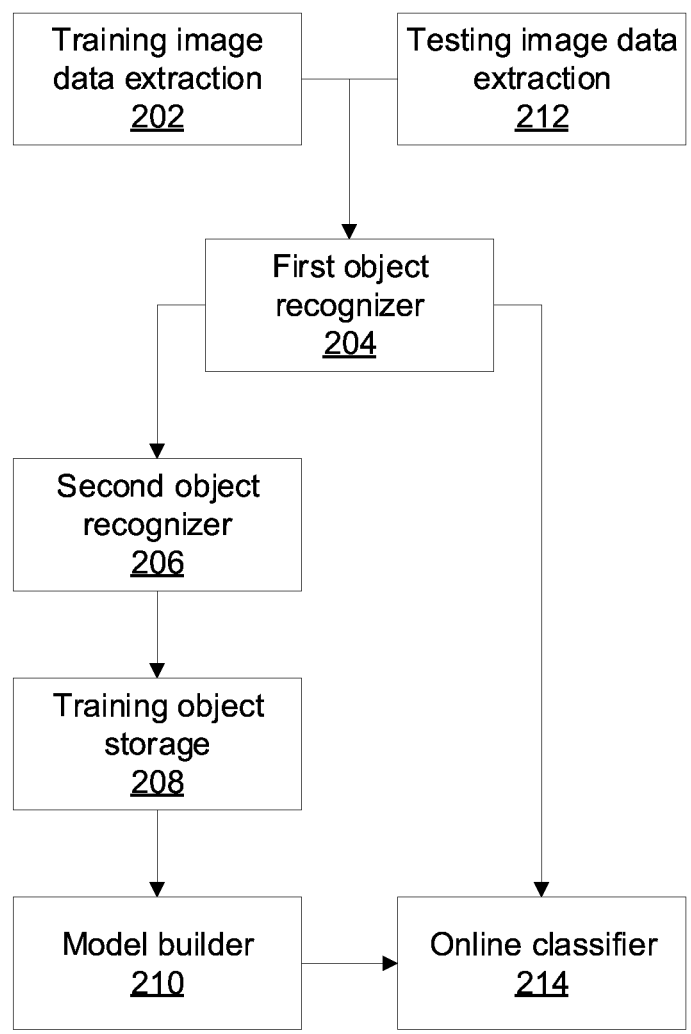
FIG. 2 is a block/flow diagram of a high-level overview of system/method for emulating an object recognizer, in accordance with an embodiment of the present invention.

With reference to FIG. 2, a block/flow diagram is provided illustrating a high-level overview of an exemplary system/method 200 including a plurality of components for emulating an object recognizer. In one embodiment, the system/method 200 includes a facial recognition system/method for recognizing faces from image data.

The system/method 200 can include a training image data extraction component 202 configured to extract training image data from a target application. For example, the training image data can be extracted from one or more images, one or more videos and/or a live camera feed.

The training image data extracted by the training image data extraction component 202 can be sent to a first object recognizer 204. The first object recognizer 204 is configured to recognize or detect one or more training objects of interest. The first object recognizer 204 can further output a feature representation for each of the one or more training objects. In some embodiments, the first object recognizer 204 can be further configured to extract a thumbnail of each training object and/or record a timestamp corresponding to when a training object was recognized. Thumbnails can help users review physical looks of the training objects, and the timestamps can enable selection of training objects from a specific time range.

The one or more training objects recognized by the first object recognizer 204 can be received by a second object recognizer 206. For each of the one or more training objects, it is determined whether the second object recognizer 206 recognizes the training object, and a label is assigned to each of the one or more training objects received from the first object recognizer 204 based on the determination. The determination can be made based on the thumbnails for the objects.

For example, if a given one of the one or more training objects received by the second object recognizer 206 is also recognized by the second object recognizer 206, the given training object can be assigned a label associated with the given training object being a common object (e.g., "+1"). If the given training object is not recognized by the second object recognizer 206, the given training object can be assigned a label associated with the given training object being an uncommon object (e.g., "−1").

Each of the training objects can then be stored in training object storage 208 along with supplemental data. The supplemental data for each of the training objects can include the label and the feature representation. In some embodiments, the supplemental data for each of the training objects can further include the thumbnail and/or the timestamp for the training object.

A model builder component 210 can build or learn a machine learning model based on a set of training objects with their feature representations and labels obtained from the training object storage 208. The model builder component 210 can also save the machine learning model for later usage. A user can limit the size of the set of training objects.

For example, a user can choose the last seven days of objects for learning the machine learning model.

As will be described in further detail below, the machine learning model can be a binary classifier model. Generally, a classifier model can be used to categorize new probabilistic observations into predefined categories, and a binary classifier model categorizes based on two categories. As used herein, the binary classifier model can classify an object as either a common object commonly recognized by the second object recognizer (e.g., "+1" label) or an uncommon object (e.g., "−1" label).

Now that the machine learning model has been learned, the machine learning model can be used during a testing stage to automatically identify objects that can be commonly recognized by the first and second object recognizers 204 and 206.

More specifically, a testing image data extraction component 212 is configured to extract testing image data from the target application. The testing image data can be extracted from one or more images, one or more videos and/or a live camera feed.

The testing image data extracted by the testing image data extraction component 212 can be sent to the first object recognizer 204. The first object recognizer 204 is configured to recognize or detect one or more testing objects of interest and output a feature representation for each of the one or more training objects. In some embodiments, the first object recognizer 204 can be further configured to extract a thumbnail of each testing object and/or record a timestamp corresponding to when a testing object was recognized.

An online classifier 214 is configured to classify each of the testing objects as either a common object or an uncommon object using its feature representation and the machine learning model. The common objects can be forwarded to the application of interest.

As described herein above, the machine learning model and first object recognizer 204 can be used to predict whether a new object will be recognized by the second object recognizer 206, and thus the second object recognizer 206 is not needed for objection recognition. That is, the first object recognizer 204 acts as an emulator for the second object recognizer 206. Accordingly, cost and/or resource usage can be reduced by emulating the second object recognizer 206.

The embodiments described herein can be applied within a cloud-based facial recognition system including edge devices (e.g., IoT devices) to capture user faces. More specifically, the cloud-based facial recognition system can register user profiles with the user faces as identifiers, and can verify users based on the user faces.

Figure 3:
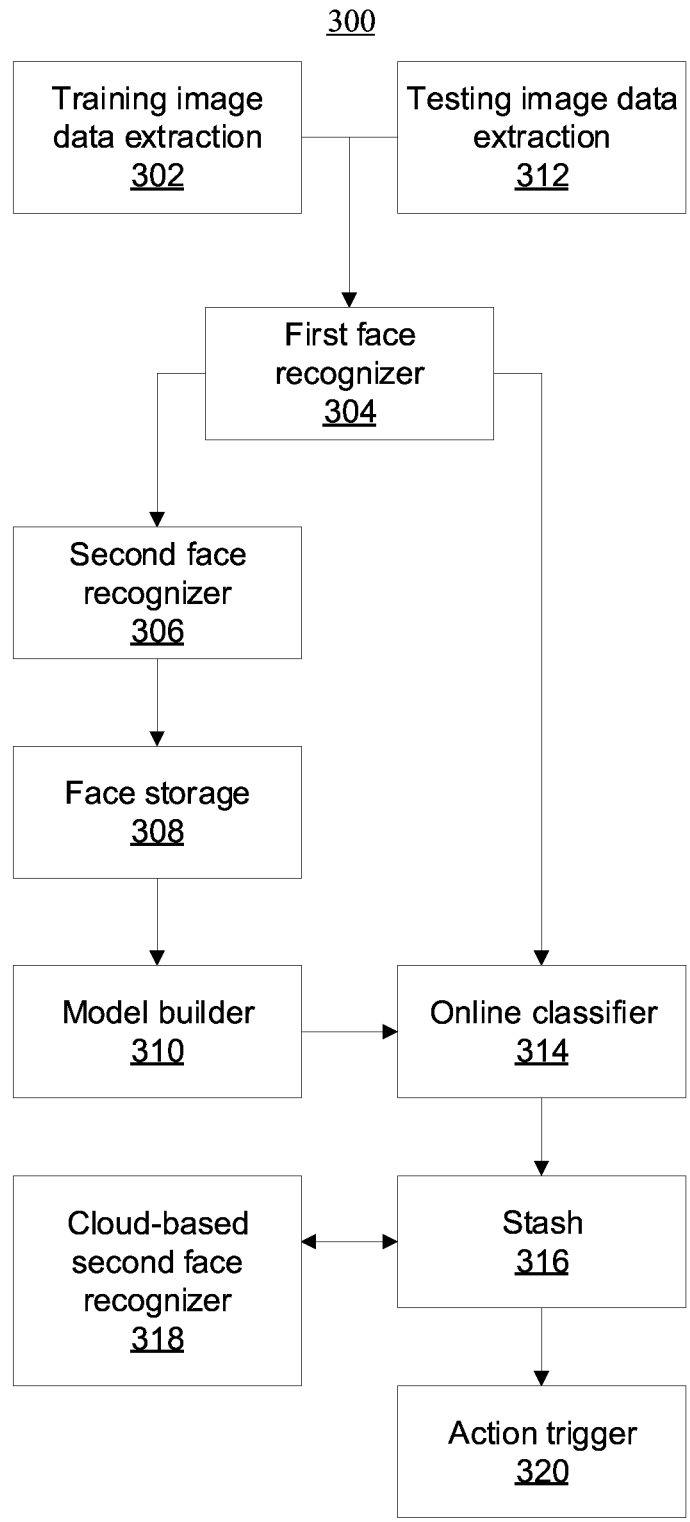
FIG. 3 is a block/flow diagram of a system/method for implementing object recognizer emulation to perform facial recognition, in accordance with an embodiment the present invention.

With reference to FIG. 3, a block/flow diagram is provided illustrating a high-level overview of an exemplary system/method 300 including a plurality of components for implementing object recognizer emulation to perform facial recognition. For example, the system/method 300 can be used within a cloud-based facial recognition system including edge devices (e.g., IoT devices) to capture user faces. More specifically, the cloud-based facial recognition system can register user profiles with the user faces as identifiers, and can verify users based on the user faces.

The system/method 300 can include a training image data extraction component 302 configured to extract training image data from a target application. The training image data can be extracted from one or more images, one or more videos and/or live camera feeds.

The training image data extracted by the training image data extraction component 302 can be sent to a first face recognizer 304. The first face recognizer 304 is configured to recognize or detect one or more faces from the training image data, similar to the first object recognizer 204 of FIG. 2.

The one or more faces recognized by the first face recognizer 304 can be received by a second face recognizer 306. It is determined whether the second face recognizer 306 recognizes each of the one or more faces received from the first face recognizer 304, and a label is assigned to each of the one or more face objects received from the first face recognizer 304 based on the determination (similar to the second object recognizer 206 of FIG. 2).

For example, if a given one of the one or more faces received by the second face recognizer 306 is also recognized by the second face recognizer 306, the given face can be assigned a label associated with the given face being a common face (e.g., "+1"). If the given face is not recognized by the second face recognizer 306, the given face can be assigned a label associated with the given face being an uncommon face (e.g., "−1").

Each of the faces can then be stored in face storage 308 along with supplemental data, similar to the object storage 208 of FIG. 2.

A model builder component 310 can build or learn a machine learning model (e.g., binary classifier) based on a set of faces with their feature representations and labels obtained from the face storage 308, similar to the model builder component 210 of FIG. 2.

Now that the machine learning model has been learned, the machine learning model can be used to automatically identify common faces recognized by the first and second face recognizers 304 and 306.

More specifically, a testing image data extraction component 312 is configured to extract testing image data from the target application. The testing image data can be extracted from one or more images, one or more videos and/or a live camera feed.

The testing image data extracted by the testing image data extraction component 312 can be sent to the first face recognizer 304. The first face recognizer 304 is configured to recognize or detect one or more test faces of interest and output a feature representation for each of the one or more test faces. The first face recognizer 304 can be further configured to extract a thumbnail of a test face. Thumbnails can help users review physical looks of the test faces. In one embodiment, the first face recognizer 304 can be further configured to record a timestamp corresponding to when a test face is recognized detected. The timestamps can enable users to select test faces from a specific time range.

An online classifier 314 is configured to classify each of the test faces as either a common face or an uncommon face using its feature representation and the machine learning model. In this step, the faces which have a high probability of being recognized by a cloud-based face recognizer 318 are identified and labeled (e.g., labeled as "+1").

The common faces are forwarded to stash component 316 for storage. The stashed faces can be sent to the cloud-based system for verification and registration. For example, the cloud-based face recognizer 318 can generate a feature representation for a stashed face if it accepts the stashed face as a valid input, and can verify whether the stashed face matches with any of the face images associated with registered user profiles. If a match is found, a positive response can be sent to the verifier on the edge. Otherwise, a negative response can be sent. Negative responses can also be sent for invalid images.

If the face image is not accepted as valid input by the cloud-based second face recognizer 318, then the edge devices may prompt a user to retake the face photo. The edge devices can repeat this step until a valid input response from the cloud-based system is received. Now, if the network connection between edge and cloud is down, the registration process cannot be completed as edge devices do not ensure that a user's face image is a valid input without the confirmation from the cloud-based system. When the network connectivity is back to normal, the stashed faces can be sent to the cloud-based second face recognizer 318 for verification and registration.

An action trigger component 320 is configured to perform an action based on the response sent by the cloud-based face recognizer 318.

In one embodiment, the action can include granting or denying access to a service based on facial recognition. However, in some cases, the edge devices may not be able to deploy a more expensive and expansive facial recognizer, recognizer X, due to excessive operational costs, limited resources, etc. To address these concerns, the online classifier 314 in accordance with the embodiments described herein can be configured to emulate recognizer X by running a more simple face recognizer, recognizer Y, that captures facial images, and selectively sends the facial images to a version of recognizer X in the cloud-based face recognizer 318 to verify the user's identity based on the user profile. Without this emulation, an edge device may not know whether a face will be recognized by recognizer X in the cloud. However, by using emulation to automatically filter out faces having a low probability of recognition by the recognizer X, network cost and processing overhead in the cloud can be reduced, which can reduce overall operational cost.

As another example, the action can include registering a user profile based on a face image. Here, a positive response can provide a notification to the user that the user profile has been successfully registered, while a negative response can prompt the user to submit a new image (e.g., retake a photo) to complete the registration process.

When there is no connectivity issue between the online classifier 314 and the cloud-based face recognizer 318, user information along with a face image can be sent to the cloud-based face recognizer 318 to register the user profile. If the face image is not accepted as valid input by the cloud-based face recognizer 318, the edge devices can prompt the user to retake the face image for verification by the cloud-based face recognizer 318. However, if the network connection is down, the user registration process cannot be completed due to lack of confirmation from the cloud-based face recognizer 318. To address these concerns, face images labelled as common face images can be locally stored and sent to the cloud-based face recognizer 318 for verification and registration when network connectivity is back to normal.

Figure 4:
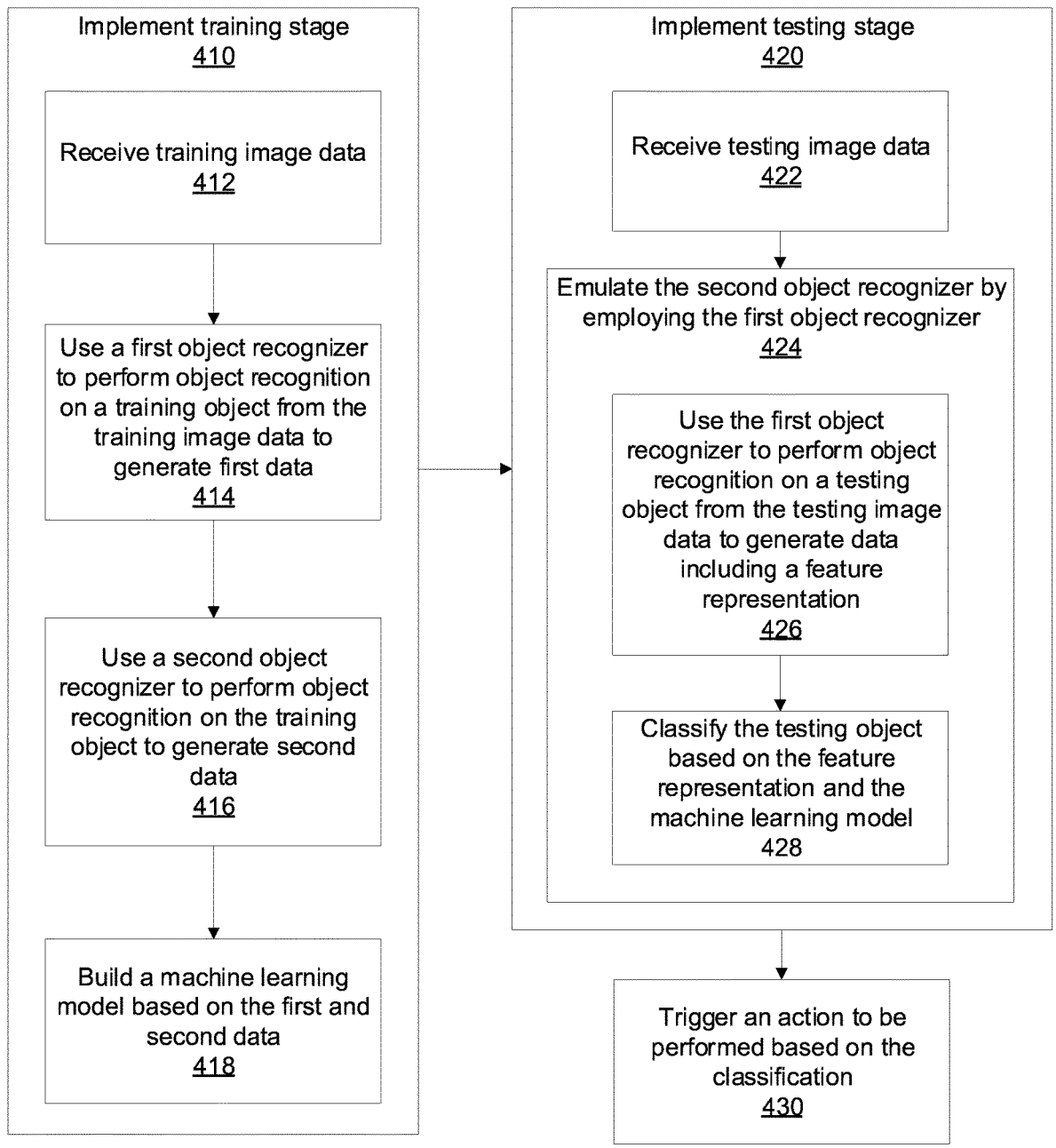
FIG. 4 is a block/flow diagram of a system/method for emulating an object recognizer, in accordance with an embodiment of the present invention.

With reference to FIG. 4, a block/flow diagram is provided illustrating a system/method 400 for emulating an object recognizer. The steps of the system/method 400 can be implemented by an emulator of a computer system. For example, the emulator can be embodied as, e.g., an edge device. In one embodiment, the computer system includes a facial recognition system configured to perform facial recognition on facial objects detected from image data.

At block 410, a training stage is implemented. As will be described in further detail below, the training stage is implemented in order to build a machine learning model that the emulator can use to emulate an object recognizer. The emulation can reduce operation cost, improving system downtime when network connectivity is down, etc.

More specifically, at block 412, training image data is received. The training image data can be extracted from one or more images, one or more videos and/or a live camera feed.

At block 414, a first object recognizer is used to perform object recognition on a training object from the training image data to generate first data. In one embodiment, the first object recognizer is stored on the emulator. The first data can include a feature representation for the training object. In some embodiments, generating the first data can further include extracting a thumbnail of the training object and/or a timestamp corresponding to when the training object was detected.

At block 416, a second object recognizer is used to perform object recognition on the training object to generate second data. The second data can include a label assigned to the training object. For example, if the second object recognizer recognizes the training object, the training object can be assigned a label associated with the training object being a common object (e.g., "+1"). Otherwise, the training object can be assigned a label associated with the given training object being an uncommon object (e.g., "-1"). Illustratively, the second object recognizer can be, e.g., a cloud-based object recognizer.

The training object can be stored along with the first and second data.

At block 418, a machine learning model is built based on the first and second data. The machine learning model can be used to automatically identify common objects. For example, the machine learning model can be a binary classifier model used to classify an object as either a common object or an uncommon object. The machine learning model can be stored for later usage.

At block 420, a testing stage is implemented. The testing stage can employ the first object recognizer, in conjunction with the machine learning model, to emulate the second object recognizer.

More specifically, at block 422, testing image data is received. The testing image data can be extracted from one or more images, one or more videos and/or a live camera feed.

At block 424, the second object recognizer is emulated by employing the first object recognizer.

For example, emulating the second object recognizer can include, at block 426, using the first object recognizer is used to perform object recognition on a testing object from the testing image data to generate data including a feature representation. In some embodiment embodiments, the data can further include a thumbnail of the testing object and/or a timestamp corresponding to when the testing object was detected.

Emulating the second object recognizer can further include, at block 428, classifying the testing object based on the feature representation and the machine learning model. The classification is used to predict whether the testing object would be recognized by the second object recognizer. For example, if the machine learning model is a binary classifier, the testing object can be classified as a common object or an uncommon object.

At block 430, an action to be performed based on the classification is triggered.

For example, in an embodiment in which a facial recognition system is configured to grant access to a service, a positive response to the classification can permit the corresponding user to access the service, while a negative response to the classification can deny access to the service.

As another example, in an embodiment in which a user profile is being registered, a positive response to the classification can provide a notification to the user that the user profile has been successfully registered, while a negative response to the classification can prompt the user to submit a new image (e.g., retake a photo) to complete the registration process.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
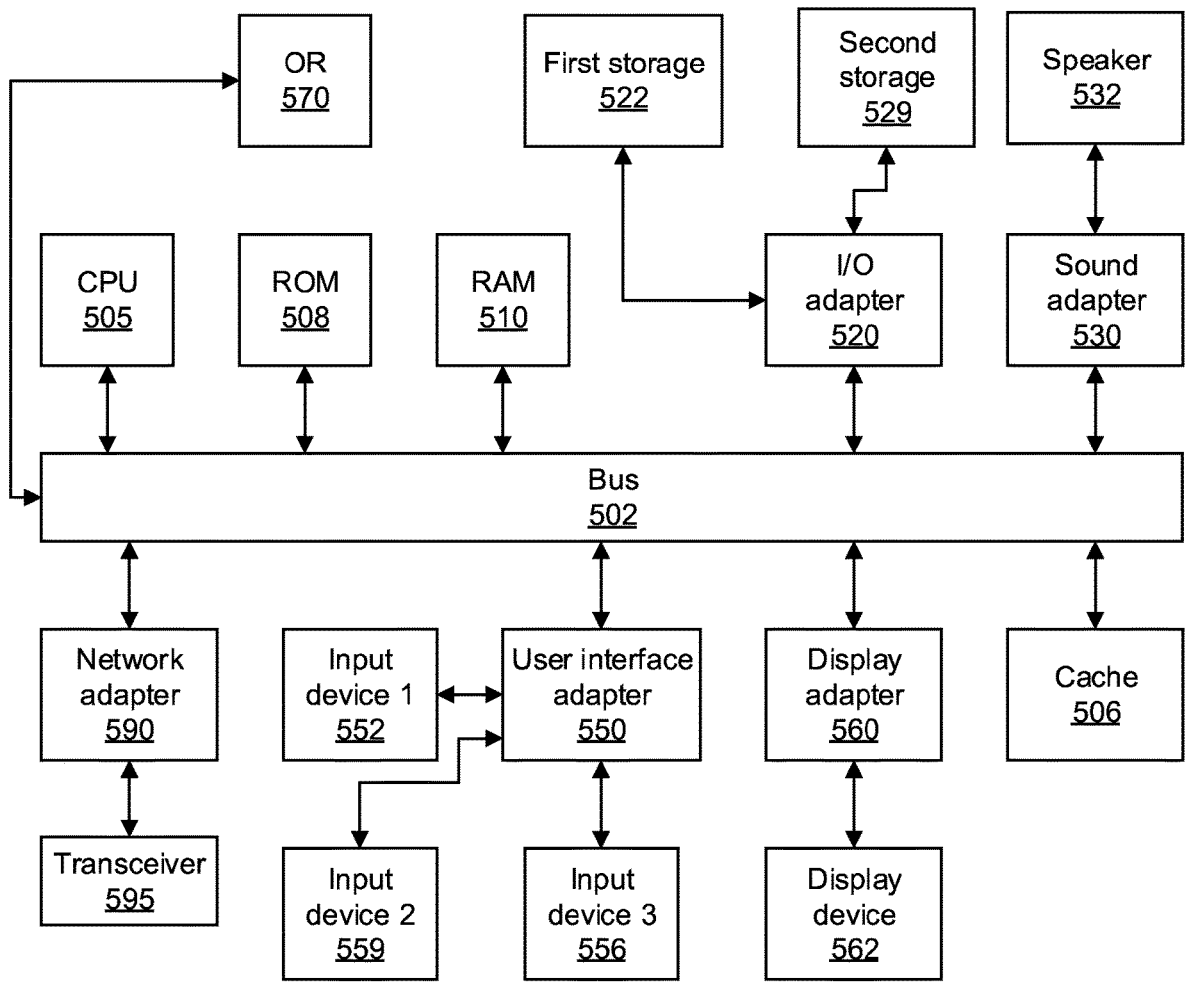
FIG. 5 is a block/flow diagram illustrating a computer system, in accordance with an embodiment the present invention.

Referring now to FIG. 5, an exemplary computer system 500 is shown which may represent a server or a network device, in accordance with an embodiment of the present invention. The computer system 500 includes at least one processor (CPU) 505 operatively coupled to other components via a system bus 502. A cache 506, a Read Only Memory (ROM) 508, a Random-Access Memory (RAM) 510, an input/output (I/O) adapter 520, a sound adapter 530, a network adapter 590, a user interface adapter 550, and a display adapter 560, are operatively coupled to the system bus 502.

A first storage device 522 and a second storage device 529 are operatively coupled to system bus 502 by the I/O adapter 520. The storage devices 522 and 529 can be any of a disk storage device (e.g., a magnetic or optical disk storage device), a solid state magnetic device, and so forth. The storage devices 522 and 529 can be the same type of storage device or different types of storage devices.

A speaker 532 may be operatively coupled to system bus 502 by the sound adapter 530. A transceiver 595 is operatively coupled to system bus 502 by network adapter 590. A display device 562 is operatively coupled to system bus 502 by display adapter 560.

A first user input device 552, a second user input device 559, and a third user input device 556 are operatively coupled to system bus 502 by user interface adapter 550. The user input devices 552, 559, and 656 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 552, 559, and 556 can be the same type of user input device or different types of user input devices. The user input devices 552, 559, and 556 are used to input and output information to and from system 500.

Object recognition (OR) component 570 may be operatively coupled to system bus 502. OR component 570 is configured to perform one or more of the operations described above. OR component 570 can be implemented as a standalone special purpose hardware device, or may be implemented as software stored on a storage device. In the embodiment in which OR component 570 is software-implemented, although shown as a separate component of the computer system 500, OR component 570 can be stored on, e.g., the first storage device 522 and/or the second storage device 529. Alternatively, OR component 570 can be stored on a separate storage device (not shown).

Of course, the computer system 500 may also include other elements (not shown), as readily contemplated by one of skill in the art, as well as omit certain elements. For example, various other input devices and/or output devices can be included in computer system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 500 are readily contemplated by one of ordinary skill in the art given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention.

What is claimed is:

1. A computer-implemented method for emulating an object recognizer, comprising:
   receiving, by an emulator associated with a computer system, testing image data;
   emulating, by the emulator employing a first object recognizer, a second object recognizer, including:
      using the first object recognizer to perform object recognition on a testing object from the testing image data to generate data, the data including a feature representation for the testing object; and
      classifying the testing object based on the feature representation and a machine learning model configured to predict whether the testing object would be recognized by a second object recognizer;
   implementing a training stage, including:
      receiving training image data;
      using the first object recognizer to perform object recognition on a training object from the training image data to generate first data including a feature representation for the training object;
      using the second object recognizer to perform object recognition on the training object to generate second data including a label assigned to the training object; and
      building the machine learning model based on the first and second data; and
   triggering, by the emulator, an action to be performed based on the classification.

2. The method of claim 1, wherein the machine learning model is a binary classification model used to classify the testing object as a common object or an uncommon object.

3. The method of claim 1, wherein the data further includes a thumbnail of the testing object and a timestamp corresponding to when the testing object was detected.

4. The method of claim 1, wherein the first data further includes a thumbnail of the training object and a timestamp corresponding to when the training object was detected.

5. The method of claim 1, wherein the computer system includes a facial recognition system.

6. The method of claimed 5, wherein performing the action includes performing an action selected from the group consisting of: granting access to a service, denying access to a service, registering a user profile, prompting a user to submit a new image to complete registration, and combinations thereof.

7. A computer program product comprising a non-transitory computer readable storage medium having program instructions embodied therewith, the program instructions executable by a computer to cause the computer to perform a method for emulating an object recognizer, the method performed by the computer comprising:
   receiving, by an emulator associated with a computer system, testing image data;
   emulating, by the emulator employing a first object recognizer, a second object recognizer, including:
   using the first object recognizer to perform object recognition on a testing object from the testing image data to generate data, the data including a feature representation for the testing object; and
   classifying the testing object based on the feature representation and a machine learning model configured to predict whether the testing object would be recognized by a second object recognizer;
   implementing a training stage, including:
      receiving training image data;
      using the first object recognizer to perform object recognition on a training object from the training image data to generate first data including a feature representation for the training object;
      using the second object recognizer to perform object recognition on the training object to generate second data including a label assigned to the training object; and
   building the machine learning model based on the first and second data; and
   triggering, by the emulator, an action to be performed based on the classification.

8. The computer program product of claim 7, wherein the machine learning model is a binary classification model used to classify the testing object as a common object or an uncommon object.

9. The computer program product of claim 7, wherein the data further includes a thumbnail of the testing object and a timestamp corresponding to when the testing object was detected.

10. The computer program product of claim 7, wherein the first data further includes a thumbnail of the training object and a timestamp corresponding to when the training object was detected.

11. The computer program product of claim 7, wherein the computer system includes a facial recognition system.

12. The computer program product of claim 11, wherein performing the action includes performing an action selected from the group consisting of: granting access to a service, denying access to a service, registering a user profile, prompting a user to submit a new image to complete registration, and combinations thereof.

13. A system for emulating an object recognizer, comprising:
   an emulator including at least one processor device operatively coupled to a memory device and configured to execute program code stored on the memory device to:
   receive testing image data;
   emulate, by employing a first object recognizer, a second object recognizer by:
   using the first object recognizer to perform object recognition on a testing object from the testing image data to generate data, the data including a feature representation for the testing object;
   implement a training stage by:
      receiving training image data;
      using the first object recognizer to perform object recognition on a training object from the training image data to generate first data including a feature representation for the training object;
      using the second object recognizer to perform object recognition on the training object to generate second data including a label assigned to the training object; and
   building the machine learning model based on the first and second data; and
   classify the testing object based on the feature representation and a machine learning model configured to predict whether the testing object would be recognized by a second object recognizer; and
   trigger an action to be performed based on the classification.

14. The system of claim 13, wherein the machine learning model is a binary classification model used to classify the testing object as a common object or an uncommon object.

15. The system of claim 13, wherein the data further includes a thumbnail of the testing object and a timestamp corresponding to when the testing object was detected.

16. The system of claim 13, wherein the system includes a facial recognition system.

17. The system of claim 16, wherein the action is selected from the group consisting of: granting access to a service, denying access to a service, registering a user profile, prompting a user to submit a new image to complete registration, and combinations thereof.

* * * * *